United States Patent [19]

Friday

[11] 3,877,024

[45] Apr. 8, 1975

[54] SYNCHRO TO PULSE WIDTH CONVERTER FOR AN AVIONICS SYSTEM

[75] Inventor: Robert E. Friday, Lenexa, Kans.

[73] Assignee: King Radio Corporation, Olathe, Kans.

[22] Filed: Aug. 27, 1973

[21] Appl. No.: 391,982

[52] U.S. Cl. ........................................ 340/347 SY

[51] Int. Cl. ........................................ H03k 13/02

[58] Field of Search ....... 340/347 SY; 235/186, 189

[56] References Cited

UNITED STATES PATENTS

| | | | |
|---|---|---|---|
| 3,651,514 | 3/1972 | Klatt | 340/347 SY |
| 3,676,659 | 11/1972 | Asmussen | 235/186 |

*Primary Examiner*—Malcolm A. Morrison
*Assistant Examiner*—David H. Malzahn
*Attorney, Agent, or Firm*—Lowe, Kokjer, Kircher

[57] ABSTRACT

An electronic substitute for the feedback synchro in a synchro control system is described. The three-wire output from a conventional synchro device is delivered to electronic circuitry which generates a rectangular output waveform, the phase of which varies linearly with respect to the vector angle of the synchro rotor shaft. This variable phase, when synchronized, provides a linear output to a feedback control system when deviations from a reference synchro angle setting occur.

9 Claims, 7 Drawing Figures

WAVEFORM A

WAVEFORM B

LOGIC A

LOGIC B

WAVEFORM C

OUTPUT WAVEFORM

SYNCHRO TO PULSE WIDTH CONVERTER FOR AN AVIONICS SYSTEM

BACKGROUND AND BRIEF DESCRIPTION OF THE INVENTION

The usual means for accomplishing remote synchronization in an avionics electronic heading converter system involves the connection of a second three-wire synchro to the first and further utilizing a motor or other mechanical means for rotating the second synchro until same is vectorially aligned with the first. When the second synchro is physically locked, its output is proportional to the sine of the angular motion of the first. The second synchro output voltage will represent an error signal which may be demodulated to provide a desired DC output voltage capable of being utilized in a given feedback control system.

In the subject invention, an electronic method is used to convert the three-wire output from the first synchro to a digital square wave, the phase of which is shifted relative to a reference square wave as a function of the vector angle of the first or reference synchro. With the use of "exclusive or" gates, this digital square wave is then summed "modulo two" — first with the reference square wave and thence with the reference square wave after it has been shifted by 90°. This summation results in two pulse width modulated waveforms, one of which lags the other by 90 synchro angle degrees. The percentage of modulation of each waveform is linearly related to the input synchro angle.

These two waveforms are inputted to a logic gate network and to a circuit which generates their analog sum and analog difference. The analog sum and difference signals are delivered to a comparator network, causing the gating circuitry to select the waveform that is nearest to 50 percent modulation. The gating network also inverts the selected waveform at appropriate intervals, and the net result is an output waveform appropriate for use in a feedback control system.

When a reference synchro angle is to be established for the feedback control system, further gate switching between the input wave forms is inhibited and the existing DC output obtained from the selected pulse width modulated waveform is stored in a synchronizer. This method prevents the loss of the reference angle regardless of the magnitude of the control input variation.

Accordingly, one of the primary objects of this invention is to eliminate the need for a second synchro and servo motor in a synchro system. This is accomplished, in part, by generating the feedback control system signal utilizing electronic means.

It is a feature of this invention that any device utilizing a synchro type output could have a need for this system. For example, in avionics compass heading or pitch attitude devices as well as other radio direction related equipment utilize synchro type outputs compatible with the subject invention.

Another object of the invention is to provide a unique circuit configuration for use with avionics devices having a synchro system(s) therein. It is a feature of the invention that the device utilizing said invention may be made for less costs, smaller and lighter in weight and will be more reliable.

A still further object of the invention is to provide a unique avionics synchro system that insures proper operation regardless of the magnitude of the control input variations.

These and other objects of the invention, together with the features of novelty appurtenant thereto, will appear in the course of the following description.

DETAILED DESCRIPTION OF THE DRAWINGS

In the accompanying drawings which form a part of the specification and are to be read in conjunction therewith, and in which like reference numerals are employed to indicate like parts in the various views.

Figure 7:
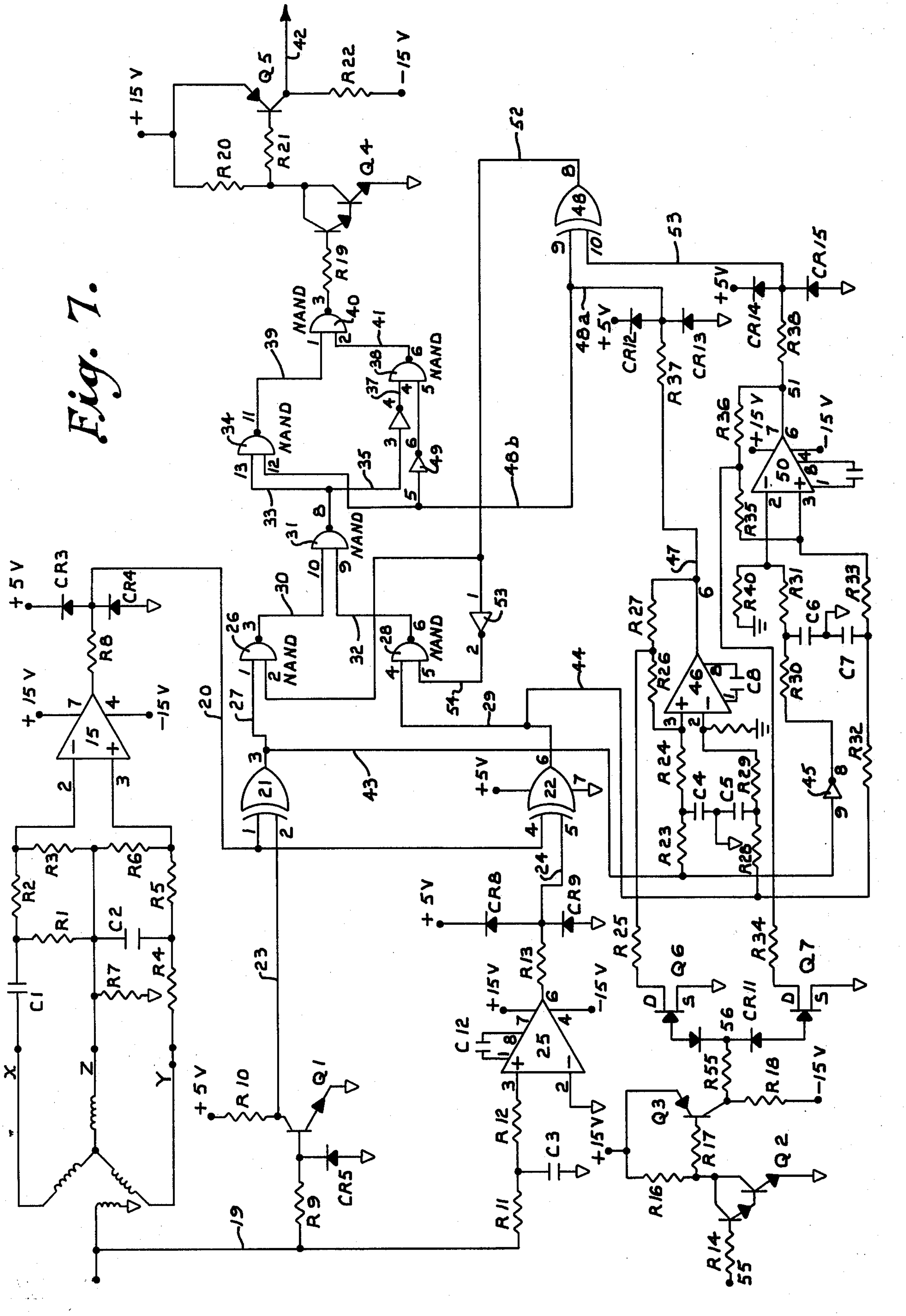
FIG. 7 is a schematic diagram of the synchro converter.

Turning now more particularly to the drawings, FIG. 7 shows a 400 hz. sinusoidal input being applied to the synchro rotor causing induced stator voltages to appear at points X, Y and Z. The signal between X and Z is shifted 30° in a positive phase direction and delivered to pin 2 of differential amplifier 15 by the combination of capacitor and resistors combination C1, R1, R2 and R3, respectively. The signal appearing between points Y and Z is phase shifted by −30° and delivered to pin 3 of differential amplifier 15 by the combination of capacitor and resistors combination C2, R4, R5 and R6, respectively.

The differential output is transmitted through R8 to clipping diodes CR3 and CR4 and delivered to "exclusive OR" gates 21 and 22 via line 20. The waveform appearing on line 20 is a square wave, the phase of which, relative to the reference 400hz, is directly proportional to the vector angle setting of the input synchro rotor.

The 400 hz. synchro input signal is used as a reference source and appears along line 19, where it is delivered through R9 to transistor Q1, which operates as a saturating invertor. The 400 hz. square wave output from Q1 is transmitted via line 23 to pin 2 of "exclusive OR" gate 21.

The reference signal on line 19 is phase shifted −90° and delivered to operational amplifier 25 by the combination of circuit elements R11, C3 and R12. The output of amplifier 25 is delivered through R13 to clipping diodes CR8 and CR9, and through line 24 to pin 5 on "exclusive OR" gate 22. The square waves appearing on lines 23 and 24 differ in phase by 90 degrees.

Figure 1:
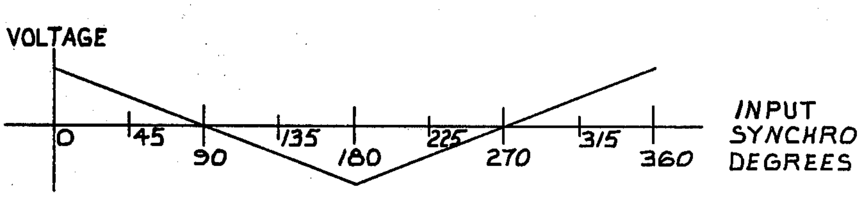
FIG. 1 is an intermediate waveform, identified as Waveform A.
Figure 2:
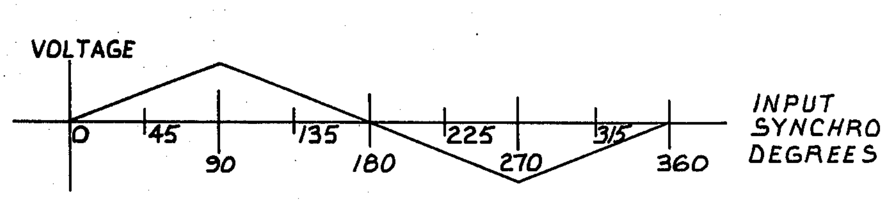
FIG. 2 is an intermediate waveform which lags Waveform A by 90° and is identified as Waveform B.

"Exclusive OR" gates 21 and 22 perform "modulo two" addition on their respective input signals. This results in a pulse width modulated waveform appearing at the output of gate 21, whose equivalent DC profile is shown in FIG. 1. This profile is identified as "Waveform A." FIG. 2 represents the equivalent DC profile of the output pulse width modulated waveform appearing at gate 22, and is labelled "Waveform B," however lagging Waveform A by 90°.

Figure 3:
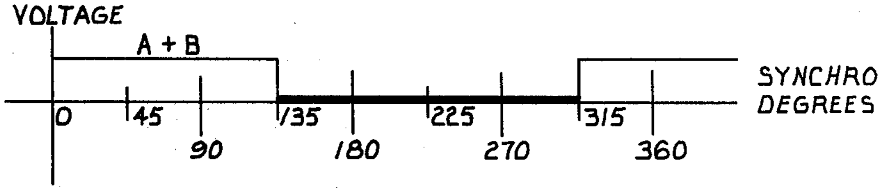
FIG. 3 represents the analog comparison of Waveform A amd Waveform B and is identified as Logic A.
Figure 4:
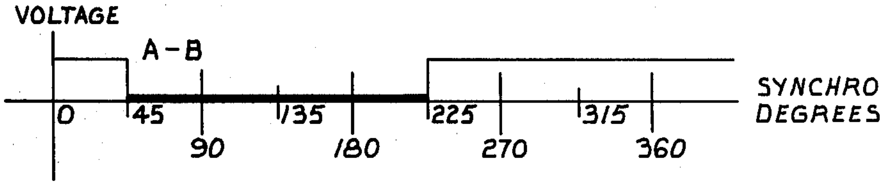
FIG. 4 represents the analog difference comparison of Waveform A and Waveform B, and is identified as Logic B.

The outputs of gates 21 and 22 are delivered via lines 43 and 44 respectively to a circuit which generates the logic gate switching signals identified in FIGS. 3 and 4 as "logic A" and "Logic B." Logic A represents the analog sum comparison of Waveform A and Waveform B, while Logic B represents the analog difference comparison between Waveform A and Waveform B.

Line 43 enters a filter circuit consisting of the circuit elements R23, R24 and C4. This filter delivers Waveform A to pin 3 of operational amplifier 46. Line 44 enters a filter circuit consisting of R28, R29 and C5, which delivers Waveform B to pin 2 of amplifier 46. Resistors R26 and R27 provide positive feedback which enables the amplifier to accomplish hysterisis type switching action. This feedback is controllable by circuitry to be described later. The output of amplifier 46 appearing on line 47 is delivered via R37 to clipping diodes CR12 and CR13. The voltage at this diode junction will be a logic signal which represents the analog difference comparison between lines 43 and 44, and will be identified as Logic B in FIG. 4. The Logic B signal is then delivered via line 48*a* to pin 9 of "exclusive OR" gate 48.

Operational amplifier 50 operates similarly to operational amplifier 46. The outputs of gates 21 and 22 are delivered to this circuit via lines 43 and 44, respectively. Lines 43 runs to inverter 45, and thence to a filter circuit comprised of circuit elements R30, R31 and C6, thereby delivering the inverse of Waveform A to operational amplifier 50. Line 44 is connected to amplifier 50 and Waveform B is delivered thereto via the filter combination of R32, R33 and C7.

Resistors R35 and R36 provide positive feedback path which is necessary for hysterisis switching. This feedback is also controllable by circuitry to be described later. The output is delivered via R38 to clipping diodes CR14 and CR15, and from this junction to pin 10 of gate 48 along line 53. The waveform appearing along line 53 is identified in FIG. 3 as Logic A. Although amplifier 50 with the diodes CR14 and CR15 produces the analog difference comparison of the signals appearing at its input terminals, the presence of inverter 45 results in a net analog summation comparison of Waveform A and Waveform B.

Figure 5:
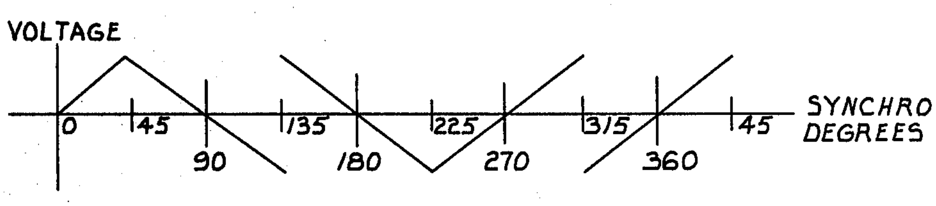
FIG. 5 is a waveform, which is obtained by selecting Waveform B when Logic A and Logic B are equal, and by selecting Waveform A when Logic A and Logic B are different, and is identified as Waveform C.
Figure 6:
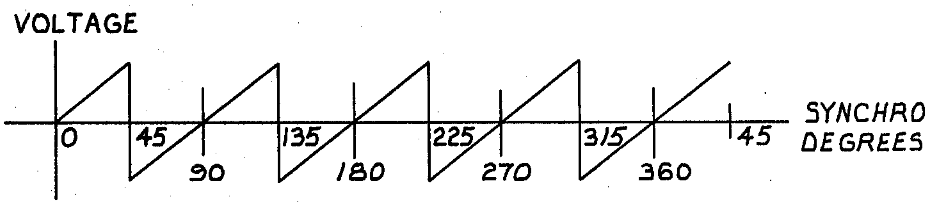
FIG. 6 represents the output waveform, and is generated by inverting Waveform C whenever Logic B is zero.

The task of the gating logic circuit is to construct the output waveform shown in FIG. 6. To do this, Waveform A is selected whenever Logic A is different from Logic B, and Waveform B is selected whenever Logic A and Logic B are equal, producing Waveform C shown in FIG. 5. Waveform C must be inverted whenever Logic B is equal to zero, and this will result in the output waveform shown in FIG. 6.

"Exclusive OR" gate 48 produces the "modulo two" sum of Logic A and Logic B. The output of gate 48 will thus be zero whenever Logic A equals Logic B. This output is transmitted via line 52 to NAND gate 26 and to inverter 53. The output of inverter 53 is delivered via line 54 to NAND gate 28. As mentioned previously, the outputs of gates 21 and 22 are delivered via lines 27 and 29 to NAND gates 26 and 28, respectively. The output of NAND gate 26 will be Waveform A inverted, and will be delivered to NAND gate 31 via line 30. The output of NAND gate 28 will be Waveform B inverted, and is delivered to NAND gate 31 via line 32. Only one of these NAND gates 26 or 28 will be transmitting at once, depending on the previously mentioned sum and difference relationship of the Logic A and Logic B signals. For example, referring to FIG. 3 and FIG. 4, it is seen that one interval in which Logic A is equal to Logic B occurs when the reference synchro angle is between 135° and 225°. Since Logic A equals Logic B in this interval, the Waveform B is to be transmitted. NAND gate 31 will invert the input waveform and thus reproduce Waveform B at its output.

Waveform C (FIG. 5) will thus appear at the output of NAND gate 31, and will be delivered via line 33 to pin 13 on NAND gate 34 and via line 35 to inverter 36. The output of inverter 36 is delivered to pin 4 on NAND gate 38 via line 37. The Logic B signal appearing on line 48*b* is delivered to pin 12 on NAND gate 34 and to inverter 49. The output of inverter 49 goes to pin 5 on NAND gate 38.

NAND gate 34 will transmit Waveform C inverted along line 39 to pin 1 of NAND gate 40 whenever Logic B equals 1. When Logic B equals zero, NAND gate 38 will transmit Waveform C along line 41 to pin 2 on NAND gate 40. NAND gate 40 will invert its input, and thus when Logic B equals zero the output of NAND gate 40 will be Waveform C inverted.

The output of NAND gate 40 is delivered via R19 to transistor Q4 and associated circuitry consisting of R20, R21, Q5, C10 and R22, resulting in a pulse width modulated output with equivalent DC values shown in FIG. 6 capable of being filtered to a DC voltage compatible with a feedback control system. This output will appear on line 42, and is depicted by FIG. 6.

For example, in the interval between 135 and 225 synchro degrees Logic A equals Logic B and Logic B equals zero. Lines 47 and 53 will thus be zero and line 52, the output of exclusive OR gate 48 will likewise be zero. Thus the inputs to NAND gate 26 will be Waveform A on pin 1 and a "zero" on pin 2. The inputs to NAND gate 28 will be a "one" on pin 5 and Waveform B on pin 4.

Since the "truth table" of a NAND gate is ,90 this means that the output of NAND gate 26 will be a "one," and the output of NAND gate 28 will be Waveform B inverted. Gate 31 is a NAND gate having the aforementioned truth table, and accordingly, it outputs Waveform B along line 33 during this interval.

When a specific synchro angle is to be established as a reference for the feedback control system the existing equivalent DC voltage on the output line 42 is "stored" in a synchronizer and further switching between Waveform A and Waveform B by operational amplifiers 46 and 50 is inhibited, even though the Logic A and Logic B signals may subsequently change relative to each other.

From the above, it will be seen that a positive logic signal is normally transmitted into line 55 through R14 turning on transistor Q2. This produces a voltage drop across R16 which is transmitted through R17 turning on transistor Q3, and this changes Q3's collector voltage from −15 volts to +15 volts with respect to ground, thus turning on field effect transistors Q6 and Q7. This will result in a very large shorting effect at the junction of positive feedback resistors R36 and R27 around amplifier 46 and at the junction of positive feedback resistors R35 and R36 around amplifier 50, resulting in a very small degree of positive feedback around these two operational amplifiers. This is the normal operating condition needed to generate the Logic A and Logic B signals. The pulse width modulation range on lines 30 and 32 will operate between 25 and 75 percent modulation in this feedback condition.

When a reference input synchro position is to be established, the logic input signal on line 55 will be switched to zero, turning off Q6 and Q7. The drain-to-source impedance of these transistors will then become very high, producing a consequent increase in the positive feedback around operational amplifiers 46 and 50, by "ungrounding" the correction node between the two feedback resistors. The increased positive feedback will prevent either of the amplifiers 46 or 50 from further switching in response to input variations, and the Logic A and Logic B readings at the particular instant will thus be "stored." The output range of pulse width modulation on line 30 or 32 will then vary from 0 to 100 per cent. This range of signals will then be used by the flight control system.

From the foregoing, it will be seen that this invention is one well adapted to attain all of the ends and objects hereinabove set forth, together with other advantages which are obvious and which are inherent to the structure.

As many possible embodiments may be made of the invention without departing from the scope thereof, it is to be understood that all matter herein set forth, or shown in the accompanying drawings, is to be interpreted as illustrative and not in a limiting sense.

Having thus described my invention, I claim:

1. An avionics method for converting a three-wire output indication of heading from a conventional synchro into a pulse width modulated waveform output capable of being utilized by a feedback control system, said method comprising the steps of generating a variable phase square wave signal corresponding to a logic level from said heading output from the conventional synchro;

generating two reference square waves, causing one of said reference square waves to lag the other by 90°;

summing said logic level square wave signal "modulo two" with said reference square wave and with said lagging reference square wave, producing two intermediate pulse width modulated waveforms from said summing step;

generating two logical switching waveforms, the first of said switching waveforms representing the analog difference comparison between said intermediate waveforms, and the second of said switching waveforms representing the analog sum comparison of said intermediate waveforms; and switching a logic gating circuit with said switching waveforms, said switching operable to alternately select and conditionally invert said intermediate waveforms at appropriate intervals, said selection and conditional inversion producing said pulse width modulated output waveform.

2. The method as in claim 1, including the step of establishing a reference input synchro position, said step operable to store said logic switching waveforms, and comprising the step of switching the state of a transistor control circuit, said last mentioned switching step thereby increasing the positive feedback in two logic switching circuits sufficiently to inhibit further switching after the reference synchro position has been established.

3. The method as in claim 2, wherein said method includes the step of resetting said reference synchro angle position, said resetting step further comprising the steps of turning on said transistor control circuit by the application of a positive logic pulse, and turning off said transistor control circuit by the application of a zero state logic pulse at the appropriate instant.

4. The method as in claim 1, wherein said step of generating said variable phase square wave signal includes the steps of phase shifting the heading outputs from the conventional synchro, and inputting said phase shifted signals into a differential amplifier, said differential amplifier operable to generate a variable phase square wave signal corresponding to a logic level.

5. An avionics system for converting a three-wire synchro motor having at least two voltage outputs capable of representing aircraft heading or similar navigation information into a pulse width modulated waveform output, said system comprising means for phase shifting the outputs from said conventional synchro motor;

means for generating a phase modulated square wave, the phase of which is proportional to the rotor setting of said synchro motor;

means for generating two reference square waves, one of which lags the other;

means for summing said phase modulated square wave "modulo two" with said reference square wave and with said lagging reference square wave, said summing means producing two intermediate pulse width modulated waveforms;

means for generating two logic switching waveforms from said intermediate pulse width modulated waveforms;

means comprising a logic gating network operable to generate said pulse width modulated output, said means operable to alternately sample said intermediate waveforms at appropriate intervals, said means being switched by said logic switching waveforms.

6. The combination as in claim 5, said output capable of being utilized by a feedback control system.

7. The combination as in claim 5, including means interconnected with said logic gating network for establishing a reference synchro angle position.

8. The combination as in claim 7, including means interconnected with said synchro angle position establishing means to reset said reference synchro angle position.

9. The combination as in claim 8, said resetting means being remotely actuable.

* * * * *